(No Model.)  2 Sheets—Sheet 1.

C. E. CLISBEE.
INSULATED CAN.

No. 358,732.  Patented Mar. 1, 1887.

Witnesses:
Thomas Hobday.
Charles E. W. Woodward.

Inventor
Clarence E. Clisbee
by A. N. Revere
attorney (No Model.)  2 Sheets—Sheet 2.

C. E. CLISBEE.
INSULATED CAN.

No. 358,732. Patented Mar. 1, 1887.

Witnesses
Edwin G. Alexander
Benj. P. Richardson

Inventor
Clarence E. Clisbee,
by N. H. Reeves
Attorney

UNITED STATES PATENT OFFICE.

CLARENCE E. CLISBEE, OF BOSTON, MASSACHUSETTS.

INSULATED CAN.

SPECIFICATION forming part of Letters Patent No. 358,732, dated March 1, 1887.

Application filed October 14, 1886. Serial No. 216,291. (No model.)

*To all whom it may concern:*

Be it known that I, CLARENCE E. CLISBEE, of Boston, in the county of Suffolk and State of Massachusetts, have invented certain new and useful Improvements in Insulated Cans, of which the following, taken in connection with the accompanying drawings, is a specification.

The object of this invention is to furnish an improved insulated can for coffee and other beverages, packed in its body and top to resist radiation, so that the liquid may retain its heat for twenty-four hours or more; and, also, to provide a vent-tube opened or closed by a slight rotary movement of the screw-cap, which movement is limited, so that the cap cannot be removed by unauthorized parties. The faucet is controlled by a seal to prevent any tampering with the contents of the can.

Figure 1:
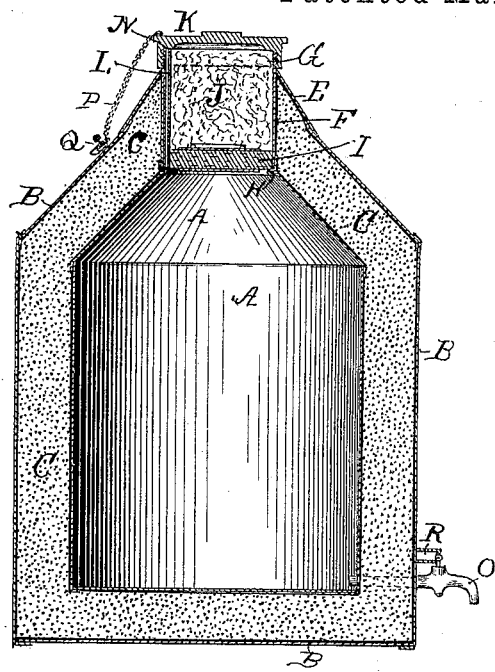
Figure 2:
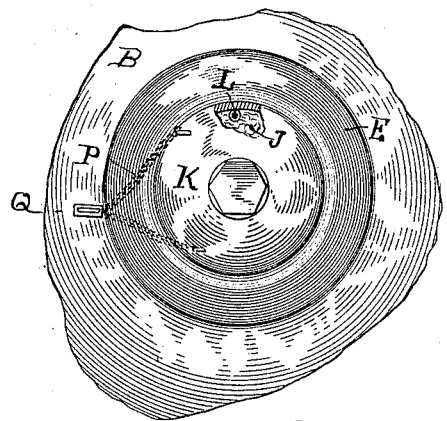
Figure 3:
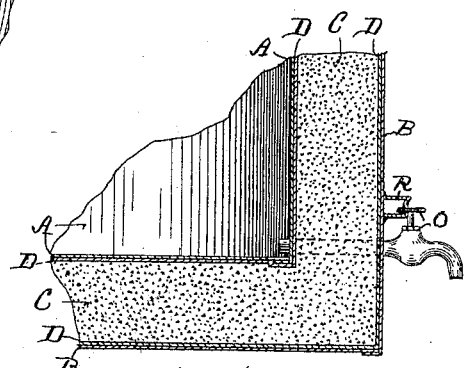
Figure 4:
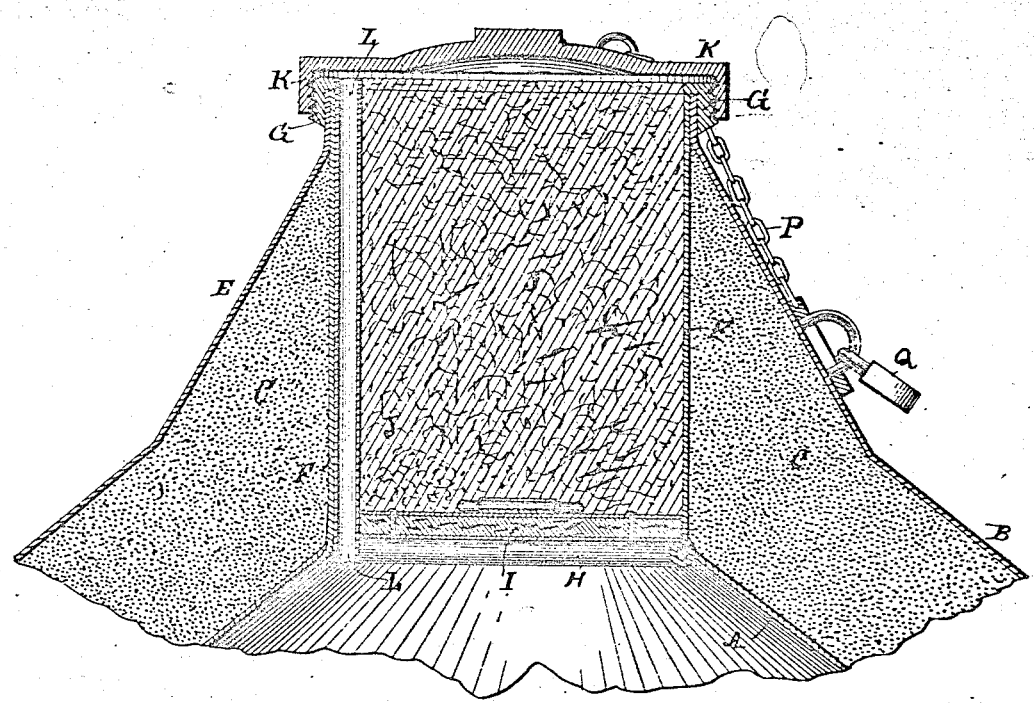
Figure 5:
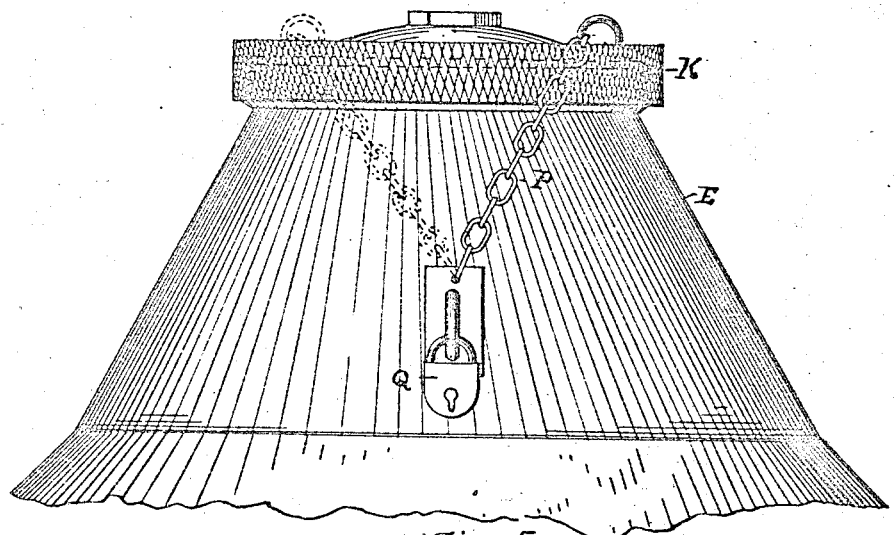

In the drawings, Figure 1 is a vertical section through my improved can; Fig. 2, an enlarged detail view of the top of the can; and Fig. 3, a like view of the body, showing its double wall and paper lining. Fig. 4 is an enlarged vertical section through the top or mouth of the can, showing the vent-tube unclosed by the turn of the screw-cap; and Fig. 5, an external view of the top.

The body of my improved can consists of two concentric cylindrical vessels, A and B, each, by preference, of a frusto-conical form in its upper portion. Between these vessels, at bottom and all around, the space is filled with a non-conducting filling, C, preferably of kiln-dried sawdust rammed hard and firmly packed. The inner vessel, A, is of copper tinned on its inner surface to resist corrosion, while the outer vessel is of heavy tinned or galvanized sheet-iron strengthened by external hoops. Crossed supports may also re-enforce its bottom.

As an additional and most effective guard against radiation of heat, I apply to the entire outer surface of the inner vessel, and preferably to the inner surface of the outer vessel, one or more layers of stout paper, D, or equivalent non-conducting material, and I find that by thus coating the sheet-metal body I lengthen by several hours the time during which the coffee is kept hot as compared with the former practice without such coating.

The can top or mouth is peculiar in some respects. Its outer wall, E, tapers upwardly to meet the upper edge of a cylinder, F, which is a vertical extension of the reduced top of the inner vessel, A. The space inclosed between E and F is packed with the filling C. A threaded ring, G, forms the upper edge of this top.

At the lower edge of the cylindrical part F a shoulder, H, projects inwardly to support a cork or other non-conducting plug, I, provided with a suitable handle for lifting it out when desired. Above this plug the space is filled up to the top of the ring G with mineral wool or like packing J, either inclosed in a bag or filled in and pressed down without such flexible receptacle. By this construction I keep the heat from radiating at the top, and the cap K, which screws onto the ring G, will remain cool for hours longer than has been possible heretofore.

L represents a vent tube secured within the cylinder F and extending from the air-space within the can up flush with the upper edge of the screw-ring G. The screw-cap K has an annular flange, N, which projects inwardly and bears upon the upper end of the vent-tube L, shutting off all ingress of air. A partial turn of the screw-cap opens the vent and permits the liquid to be drawn from the faucet O. I limit the movement of the cap at this point by extending a chain, P, from it to a staple with padlock Q and a key to secure the other end to the can.

I provide a rest, R, for the faucet-handle to check its closing movement at the proper point, and in shipping filled cans I affix a metallic seal of any suitable pattern to secure the handle to its rest, so as to guard against drawing off the beverage in transit.

The can is provided with suitable lifting-handles. The edges of the cap K are milled or roughened, and at the top I form an angular protuberance, to which a wrench may be applied.

I claim as my invention—

1. The described can having a top or mouth formed of the tapering wall E and cylinder F, with interposed packing C and terminal screw-ring G, and with shoulder H and vent-tube L, fixed within the cylinder, in combination with the plug I, the superposed packing J, and the screw-cap K, each separately removable from the can-mouth, substantially as set forth.

2. In an insulated can, the top provided at its upper edge with the screw-ring G, and having a vent-tube, L, fixed within it, in combination with the screw-cap K, adapted to open and close such vent, and with suitable means of limiting the movement of the cap, for the purpose set forth.

In testimony whereof I have signed my name to this specification, in the presence of two subscribing witnesses, on this 8th day of October, A. D. 1886.

CLARENCE E. CLISBEE.

Witnesses:
N. H. SPENCER,
FRANK T. BENNER.